Patented Mar. 17, 1953

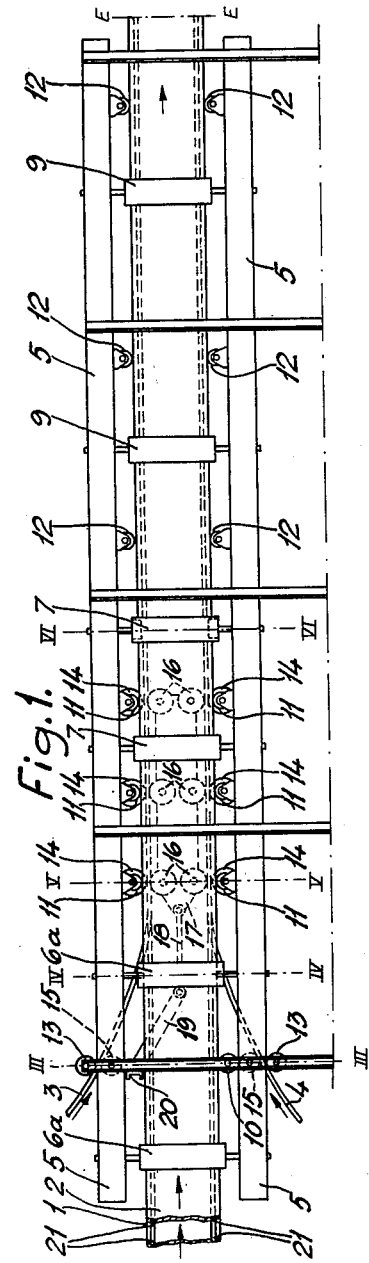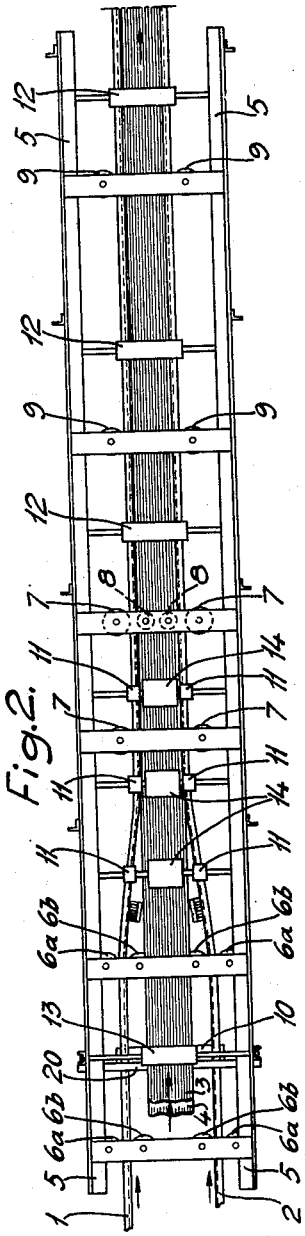

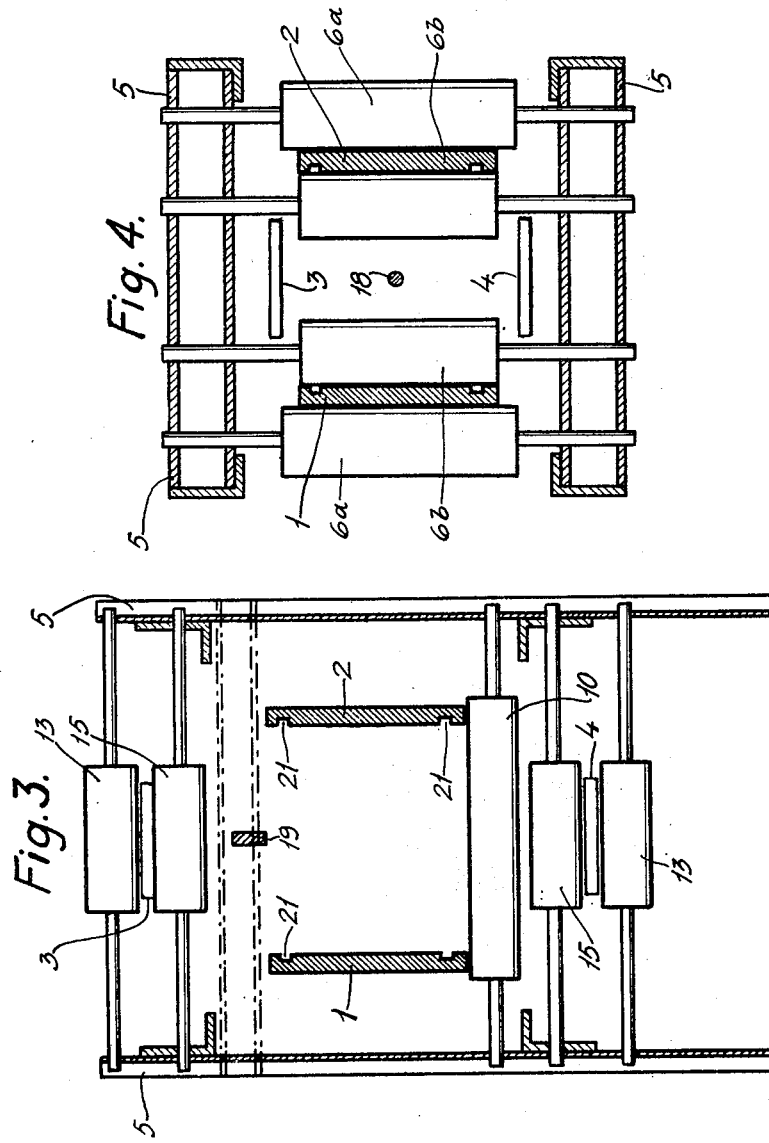

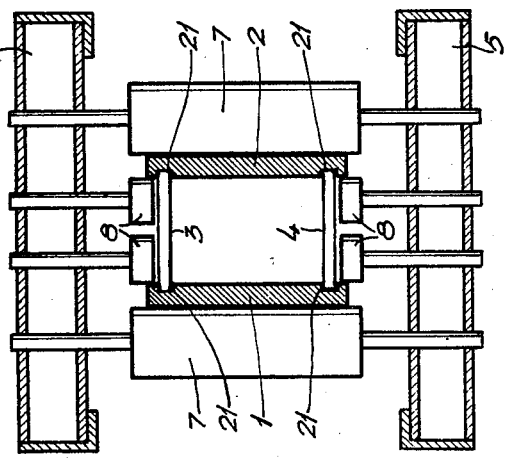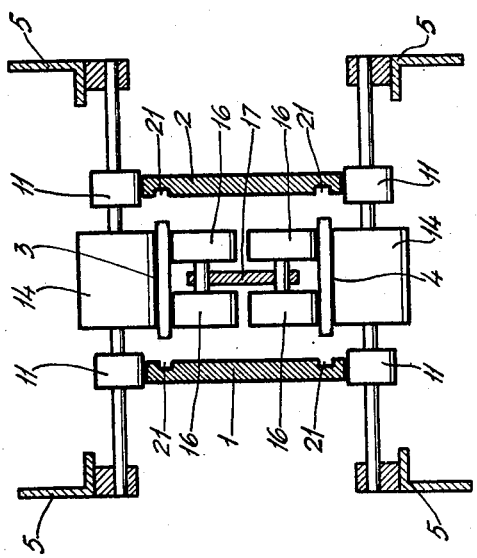

2,631,956

UNITED STATES PATENT OFFICE 2,631,956

METHOD AND DEVICE FOR THE MANUFACTURE OF BOX GIRDERS

Knut Lennart Bergvall, Ernst Erik Dahlberg, and Allan Otto Georg Palmgren, Stockholm, Sweden, assignors to A B Bostadsforskning, Stockholm, Sweden, a Swedish joint-stock company Application May 25, 1949, Serial No. 95,354
In Sweden June 1, 1948

3 Claims. (Cl. 154—83)

The present invention relates to a method for the manufacture of box girders or similar structural elements comprising four longitudinal walls. The invention is substantially characterized in that the four walls, each in the form of a continuous strip, are moved simultaneously and continuously in their longitudinal direction along converging paths controlled by guiding members, and thereby brought to their respective relative positions to form the desired section of the girder and that during their continued movement the walls are retained in their relative positions by guiding members while being connected to each other, e. g., gluing, whereafter the box girder thus obtained is cut to the desired lengths.

If the manufacture of box girders according to the invention much work is saved compared with the manual methods now used. Furthermore, considerable quantities of material are saved, waste material being avoided at the cutting and shaping of the different walls.

The invention is ilustrated in the accompanying drawings, in which Fig. 1 shows a side view of an embodiment of a device for the manufacture of box girders according to the invention. Fig. 2 shows a top view of the same device. Fig. 3 shows a section of the device in the plane marked by III—III in Fig. 1. Figs. 4, 5 and 6 show in like manner the sections in the planes marked by IV—IV, V—V and VI—VI, respectively.

The four longitudinal girder walls 1, 2, 3 and 4 are guided, while simultaneously moving, by rollers arranged in an outer frame 5. 6a, 7 and 9 designate the rollers guiding the outer faces of the walls 1 and 2. 6b designates the rollers guiding the inner faces of said walls, and 8 designates a number of short rollers contacting and guiding the outer portions of the same faces. The edges of the walls 1 and 2 are guided by a number of rollers 10, 11, and 12 the axes of which form right angles to the axes of the rollers 6, 7, 8 and 9. The outer faces of the two other walls 3 and 4 are guided by the rolls 13 and 14, and their inner faces are guided by the rollers 15 and 16. The rollers 16 are arranged in a holder 17 provided in the hollow of the box girder, said holder being fixed to the frame 5 by means of the arms 18 and 19 and the girder 20.

Box girders are manufactured by means of the present device in the following manner: The four walls 1, 2, 3 and 4 are introduced at the left end of the device. Before the introduction, glue is applied in the grooves 21 in the inner faces of the walls 1 and 2. The rollers 6a and 6b, 13 and 15 respectively hold the four walls at a distance from each other which is greater than that which they finally are to have. In the finished girder the walls 3 and 4 shall be located inside the ends of the walls 1 and 2 and for this reason they are first guided to their correct positions. This is effected by means of the rollers 14 and 16. See Figs. 1 and 5. The walls 1 and 2 are thereafter guided towards the walls 3 and 4 by means of the rollers 7, the edges of the last mentioned walls being received by the grooves 21 in the walls 1 and 2 so that the desired girder section is obtained. The rollers 8 serve to establish the correct distance between the walls 1 and 2. See Figs. 2 and 6.

During its further movement the girder is guided by the rollers 9 and 12 which contact the surfaces and edges of the walls 1 and 2. The right end portion of the device, viewed from the plane VI—VI, should be so long with regard to the time of setting of the glue and to the speed of the feeding movement of the work piece, that a sufficient strength of the glue joints is obtained when the guiding process from the device ceases. E—E designates a section where the girder is being cut to desired lengths.

The invention is not restricted to the embodiment described. For example, the device may be surrounded by a heat-insulating casing; the joints connecting the various elements of the girder may be heated within the device or the joint surfaces may be heated before they are brought together. The joining may also be effected by screwing, nailing, welding or in some other way. Furthermore, one or more strings of heat and/or sound insulating material may be introduced into the hollow of the girder while the four walls are being brought together to form the desired section. The guiding members may consist of slide bars or other devices.

Having now described our invention, what we claim as new and desire to secure by Letters Patent is:

1. Method of producing wooden box girders for building purposes in endless lengths comprising the steps of advancing two separate and spaced, continuous wooden web strips both having the same width and parallel longitudinal edges, along spaced curved guideways towards and along an assembly path and simultaneously advancing two spaced, continuous wooden flange strips both having two parallel, longitudinal grooves along their inner surfaces facing the edges of said web strips in the completed girder, along spaced guideways towards and along said assembly path, guiding said web strips, internally as well as externally, to spaced parallel and aligned positions at a distance from each other equal to the distance between said grooves in said flange strips at a first station in said assembly path while guiding said flange strips in spaced aligned relationship at a distance from each other exceeding the width of said web strips and with their planes perpendicular to the planes of said web strips through said first station, applying glue to the grooves of said flange strips, converging said advancing flange strips at a second station to progressively press them towards and over said advancing web strips to the parallel positions they have to occupy in the completed girder, thereby entering the longitudinal edges of said web strips into the grooves of said flange strips, and finally retaining all said advancing strips in their predetermined, girder-forming positions for a sufficiently long time to cure the glue.

2. In a machine for the continuous, endless production of wooden box girders of the type comprising two parallel web strips having edges and two parallel flange strips perpendicular to said web strips having grooves receiving the edges of said web strips, the combination of a pair of spaced guiding tracks, one for each of two separate, continuous and flexible web strips, said tracks successively curving into a straight assembly path so as to bring said web strips into their final, parallel and aligned positions at the same distance from each other as in the completed girder, and comprising external guiding means outside said web strips as well as internal guiding means intermediate said strips, a second pair of spaced guiding tracks, one for each of two separate, continuous and flexible grooved flange strips perpendicular to said web strips, said second guiding tracks successively converging in a plane perpendicular to the plane of the curvature of said first mentioned guiding tracks, so as to keep said flange strips apart a distance exceeding the width of said web strips at the point where said first mentioned guiding tracks curve into said straight assembly path and so as to successively bring said flange strips into their final parallel positions at the same distance from each other as in the completed girder at a point further on in said assembly path, thereby causing the edges of said web strips to enter the grooves of said flange strips, said second guiding tracks comprising external guiding means between said flange strips, means for simultaneously advancing all said strips through the machine, means for applying glue to the grooves of said flange strips at a point where said second guiding tracks still keep said flange strips apart from said web strips, and guiding members along said assembly path for maintaining said web strips and said flange strips in their final relative positions while they are advanced through the machine for a period of time necessary for curing the glue.

3. A machine for continuous, endless production of box girders, comprising two parallel web strips having edges, two parallel flange strips perpendicular to said web strips having grooves into which the edges of said web strips are inserted, the said web strips and the said flange strips being movable in the machine in the shape of endless continuous strips, means for applying glue at least to said grooves for joining the web strips to the flange strips, a series of pairs of rollers, the position of which varies along the feed direction of the machine so that the spaces between the rollers form guiding tracks for the web strips, said tracks successively bringing said strips into their final positions perpendicular to the flange strips and the same distance from each other as in the completed girder, a second series of pairs of rollers perpendicular to said first series of rollers, the position of said second series of pairs of rollers varying along the feed direction of the machine so that the space between the rollers in the respective pairs of rollers form guiding tracks for the flange strips, said latter tracks at first bringing said strips parallel to and at a distance to each other which is greater than the width of the web strips and then successively bringing the flange strips closer to each other until they have reached their final position in relation to the web strips perpendicular to them and with the grooves of the flange strips enclosing the edges of the web strips, and a third series of pairs of rollers parallel to said other rollers and arranged after them in relation to the feed direction of the machine for maintaining the web strips and the flange strips in the final position while they are fed through the machine for a period of time necessary for curing the glue.

KNUT LENNART BERGVALL.
ERNST ERIK DAHLBERG.
ALLAN OTTO GEORG PALMGREN.

REFERENCES CITED

The following references are of record in the file of this patent:

UNITED STATES PATENTS

| Number | Name | Date |
|---|---|---|
| 1,498,447 | Giard | June 17, 1924 |
| 2,038,510 | Goff | Apr. 21, 1936 |
| 2,344,488 | Bowling | Mar. 21, 1944 |